US009614719B2

United States Patent
Rao et al.

(10) Patent No.: US 9,614,719 B2
(45) Date of Patent: Apr. 4, 2017

(54) METHOD FOR ENSURING RELIABLE COMMUNICATION BETWEEN SECURITY SOFTWARE CLIENT AND CLOUD, AND SECURITY SOFTWARE CLIENT

(71) Applicant: TENCENT TECHNOLOGY (SHENZHEN) COMPANY LIMITED, Shenzhen (CN)

(72) Inventors: Shuai Rao, Shenzhen (CN); Zixiao Nie, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 20 days.

(21) Appl. No.: 14/694,637

(22) Filed: Apr. 23, 2015

(65) Prior Publication Data

US 2015/0229510 A1   Aug. 13, 2015

Related U.S. Application Data

(63) Continuation of application No. PCT/CN2013/085734, filed on Oct. 23, 2013.

(30) Foreign Application Priority Data

Oct. 23, 2012 (CN) .......................... 2012 1 0407414

(51) Int. Cl.
  *G06F 21/00* (2013.01)
  *H04L 12/24* (2006.01)
  *H04L 29/06* (2006.01)

(52) U.S. Cl.
  CPC ........ *H04L 41/0654* (2013.01); *H04L 63/145* (2013.01); *H04L 63/1425* (2013.01)

(58) Field of Classification Search
  CPC ............................................ G06F 21/55–21/56
  (Continued)

(56) References Cited

U.S. PATENT DOCUMENTS 8,413,239 B2 * 4/2013 Sutton ................... G06F 21/554
                                                                    726/23
8,752,183 B1 * 6/2014 Heiderich ............. G06F 21/577
                                                                    726/22
(Continued)

FOREIGN PATENT DOCUMENTS

CN         101321207 A      12/2008
CN         102378132 A       3/2012
(Continued)

OTHER PUBLICATIONS

International Search Report issued Feb. 13, 2014 re: Application No. PCT/CN2013/085734; citing: US 2012/240183 A1, US 2010/132016 A1 and CN 102664884 A.
(Continued)

*Primary Examiner* — Anthony Brown
(74) *Attorney, Agent, or Firm* — Cantor Colburn LLP

(57) ABSTRACT

A method for ensuring reliable communication between a security software client and cloud includes detecting whether communication between the security software client and the cloud is abnormal; determining whether network configuration is abnormal if the communication between the security software client and the cloud is abnormal; restoring the network configuration into default network configuration if the network configuration is abnormal, wherein the default network configuration is system configuration used when the communication between the security software client and the cloud is normal; determining whether the communication between the security software client and the cloud is abnormal after the network configuration is restored into the default network configuration; and prompting a user that the
(Continued)

communication between the security software client and the cloud is abnormal if the communication between the security software client and the cloud is abnormal after the network configuration is restored into the default network configuration.

17 Claims, 4 Drawing Sheets

(58) Field of Classification Search
USPC .................................................... 726/22–25
See application file for complete search history.

(56) References Cited

U.S. PATENT DOCUMENTS

| 2003/0061506 | A1 | 3/2003 | Cooper et al. |
| 2006/0117835 | A1 | 6/2006 | Yen |
| 2010/0132016 | A1 | 5/2010 | Ferris |
| 2012/0240183 | A1 | 9/2012 | Sinha |

FOREIGN PATENT DOCUMENTS

| CN | 102664884 A | 9/2012 |
| CN | 102710663 A | 10/2012 |

OTHER PUBLICATIONS

CN Office Action issued Nov. 4, 2014 re: Application No. 201210407414.7; citing: CN 102378132 A, CN 102710663 A and US 2012240183 A1; pp. 1-7.

International Preliminary Report on Patentability and Written Opinion issued May 7, 2015 re: Application No. PCT/CN2013/085734; citing: US 2012240183 A1; pp. 1-5.

TW Office Action issued Mar. 10, 2015 re: Application No. 102138217; citing: CN 101321207 B and CN 102378132 A; pp. 1-10.

TW Office Action issued Jul. 28, 2015 re: Application No. 102138217; citing: CN 101321207 B and US 2006/0117835 A1; pp. 1-10.

Supplemental European Search Report issued Sep. 22, 2015 re: Application No. PCT/CN2013/085734; pp. 1-6.

* cited by examiner

METHOD FOR ENSURING RELIABLE COMMUNICATION BETWEEN SECURITY SOFTWARE CLIENT AND CLOUD, AND SECURITY SOFTWARE CLIENT

CROSS REFERENCE TO RELATED APPLICATIONS

This application is a continuation of International Application No. PCT/CN2013/085734, filed on Oct. 23, 2013, which claims the benefit of priority from Chinese Patent Application, No. 201210407414.7, entitled "Method for Ensuring Reliable Communication between Security Software Client and Cloud, and Security Software Client" and filed on Oct. 23, 2012, the entire contents of both of which applications are hereby incorporated by reference.

TECHNICAL FIELD

The present invention relates to communication technologies, and more particularly to a method for ensuring reliable communication between a security software client and cloud, and a security software client.

BACKGROUND

Cloud security technology appears after cloud computing technology is brought forward and is applied to an anti-virus field by security software developers. By the cloud security technology, a large number of client nodes may be combined together. Information reported to cloud by each of the client nodes may benefit other all client nodes in real time. In this way, the time difference between the birth of a new virus and the discovery of the new virus is shortened greatly, and a mode for downloading and updating a virus database by security software may be improved, so that all client nodes of the security software may utilize a new result obtained by the cloud in real time.

After the cloud security technology is brought forward, the efficient, intelligent and accurate virus recognizing and processing solution may restrain the transmission and outbreak of viruses and Trojans, and prevent virus developers from profiting from the viruses or Trojans. Thus, the virus developers try to destroy cloud security through preventing the normal communication between a security software client and the cloud.

The cloud security software should ensure the whole, rapid and secure communication between the cloud and the client on which the cloud security software is run. Virus or Trojan developers may find and utilize the bug of the cloud security software. After a virus or Trojan infects a system on the client, the virus or Trojan may interfere on a networking operation of the cloud security software on the client, rather than interfere on networking operations of other software and affect the access of a user to various unsecure software sites. In this way, the virus or Trojan may hide itself and may not be killed by the cloud security software, so that the user cannot find that the system has been infected.

Accordingly, if the cloud security software fails to connect to a cloud server, the client may not process the communication failure because the communication failure looks like a physical network interruption. And thus, the infected client cannot update the cloud security software, and also cannot clear viruses in the system through the cloud security function.

SUMMARY OF THE INVENTION

Examples of the present invention provide a method for ensuring reliable communication between a security software client and cloud. By the method, after the communication between the security software client and the cloud is interrupted because the security software client is interfered by a virus, the cloud may control the virus.

The method for ensuring reliable communication between the security software client and the cloud includes:

detecting whether communication between the security software client and the cloud is abnormal;

determining whether network configuration is abnormal if the communication between the security software client and the cloud is abnormal;

restoring the network configuration into default network configuration if the network configuration is abnormal, wherein the default network configuration is system configuration used when the communication between the security software client and the cloud is normal;

determining whether the communication between the security software client and the cloud is abnormal after the network configuration is restored into the default network configuration; and prompting a user that the communication between the security software client and the cloud is abnormal if the communication between the security software client and the cloud is abnormal after the network configuration is restored into the default network configuration.

An example of the present invention also provides a security software client, including a detecting unit, a first determining unit, a first restoring unit, a second determining unit and a prompting unit, wherein the detecting unit is to detect whether communication between the security software client and cloud is abnormal;

the first determining unit is to determine whether network configuration is abnormal when the detecting unit determines that the communication between the security software client and the cloud is abnormal;

the first restoring unit is to restore the network configuration into default network configuration when the first determining unit determines that the network configuration is abnormal, wherein the default network configuration is system configuration used when the communication between the security software client and the cloud is normal;

the second determining unit is to determine whether the communication between the security software client and the cloud is abnormal after the first restoring unit restores the network configuration into the default network configuration; and the prompting unit is to prompt a user that the communication between the security software client and the cloud is abnormal after the second determining unit determines that the communication between the security software client and the cloud is abnormal.

An example of the present invention also provides a non-transitory computer readable medium, which includes computer program codes for executing the steps in the above mentioned method.

By the above solution, the security software client may guide the user to confirm and return information through other network tools such as mails or instant messaging software. In this way, the security software client may be connected to the cloud in time, and the cloud may process the viruses.

BRIEF DESCRIPTION OF DRAWINGS

In order to describe the solution provided by the examples of the present invention clearly, the accompanying drawings referred to in the examples are illustrated briefly hereinafter.

Obviously, these accompanying drawings are some examples of the present invention, and according to these accompanying drawings, those skilled in the art can obtain other accompanying drawings without creative labor.

DETAILED DESCRIPTION

The solution of the present invention is provided by analyzing various cases that a security software client may be infected by viruses. In order to understand the example of the present invention easily, partial cases that the security software client may be infected by viruses are illustrated hereinafter. In the examples of the present invention, the security software client may be called a client for short.

(1) Cloud security software on the client is unable to detect any virus file. When scanning files, the client does not prompt a user even if the client finds a known virus file. Regardless of which scanning mode, some security software prompts the user that scanning is failed.

(2) The security software cannot be updated even if there is a new version on the client. When the user uses an "update" function, the security software prompts the user that "update is failed" or "available update is not found".

(3) Various browsers on the client are all unable to access a security software site, but are able to access other sites.

(4) The client is unable to receive data packet information from the security software site and sites related to network security when detecting these sites with a system command "ping", and prompt the user that "host is not found" or "overtime".

(5) The networking function of the security software on the client is abnormal. For example, the download of new bug patch is failed when a "bug fix" function is performed.

Figure 1:
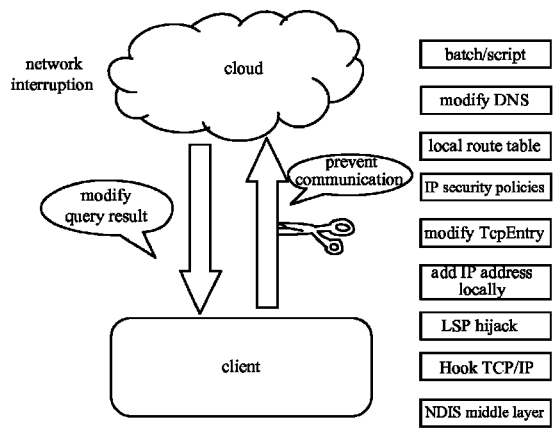
FIG. 1 is a schematic diagram illustrating communication between a security software client and a security software site according to an example.

As can be seen from the above mentioned, the communication between the client and the security software site is failed or abnormal, but the client may access other Internet resources successfully. Except some failures caused by manual operations of a user, most failures are caused by viruses or Trojans because the viruses or Trojans shield the security software site with a technology means. At present, there are multiple technology means, by which known viruses and Trojans may interfere on the communication between the client and the security software site, as shown in FIG. 1. The multiple technology means includes: viciously modifying the configuration of Dynamic Host Configuration Protocol (DHCP) service through batch/script, configuring a DNS server that is unable to parse the security software site and viciously modifying the DNS configuration of the client, viciously modifying a local route table and guiding data used for communication with the security software site to an unusable gateway export, viciously modifying IP security policies to shield the security software site, viciously modifying all TCP links in a progress of security software and setting states of the TCP links as Delete, viciously modifying a local IP address, registering a vicious Layered Service Provider (LSP) link file to detect and filter security software data packets, hooking TCP/IP.sys to drive an I/O Request Package (IRP) distributing function to filter accessing requests for the security software site, and registering a vicious Network Driver Interface Specification (NDIS) middle layer to filter data packets sent to the security software site by the client. The technology means is not limited to the above mentioned.

In the solution provided by the examples of the present invention, before starting to scan files, the client initiatively detects whether the communication between the client and cloud is abnormal. In this way, it may be avoided that a scanning progress bar is locked during a scanning process because of network failure, and it may also be avoided that the number of scanned files is not changed for a long time, thereby improving virus killing effects and user experiences. When detecting the network configuration of system on the client, the client may determine whether the network configuration is abnormal by comparing the success rate of accessing a common site with a predefined success rate threshold, and comparing the success rate of accessing a security software site with the predefined success rate threshold. In this way, a user environment caused by a physical network interruption may be distinguished from a user environment infected by a virus. In another example, the client may determine whether the network configuration is abnormal by comparing the speed of accessing the common site with a predefined speed threshold, and comparing the speed of accessing the security software site with the predefined speed threshold.

In an example, when detecting the network configuration, the client may compare the current network configuration with default system configuration. If the current network configuration is different from the default system configuration, it deems that the client may be infected by a virus. When a local blacklist cannot be updated and a cloud blacklist cannot be accessed, it is effective to compare the current network configuration with the default system configuration.

The examples of the present invention are illustrated hereinafter with reference to the accompanying drawings.

Figure 2:
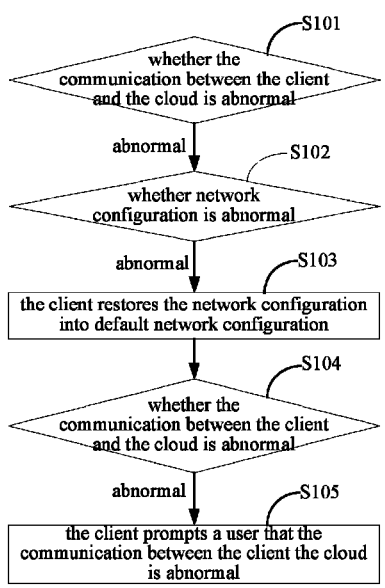
FIG. 2 is a schematic flowchart illustrating a method for ensuring reliable communication between a security software client and cloud according to an example of the present invention.

FIG. 2 is a schematic flowchart illustrating a method for ensuring reliable communication between a security software client and cloud according to an example of the present invention.

At block 101, the client detects whether the communication between the client and the cloud is abnormal.

In an example, a process of detecting whether the communication between the client and the cloud is abnormal is illustrated as follows. The client compares the success rate of accessing a common site with a predefined success rate threshold, and compares the success rate of accessing a security software site with the predefined success rate threshold. If the success rate of accessing the common site is within an acceptable range but the success rate of accessing the security software site is not within the acceptable range, the client determines that the communication between the client and the cloud is abnormal. Otherwise, the client determines that the communication between the client and the cloud is normal. In another example, the client may compare the speed of accessing the common site with a predefined speed threshold, and compares the speed of accessing the security software site with the predefined speed threshold. If the speed of accessing the common site is within an acceptable range but the speed of accessing the security software site is not within the acceptable range, the client determines that the communication between the client and the cloud is abnormal. Otherwise, the client determines that the communication between the client and the cloud is normal.

At block 102, the client determines whether network configuration is abnormal when determining that the communication between the client and the cloud is abnormal.

If the network configuration is juggled by a virus, the communication between the client and the cloud may be abnormal. Accordingly, block 102 may be used to determine whether the client is infected by the virus.

In an example, block 101 may be used as a triggering condition for starting block 102. In some cases, the triggering condition is not needed, but client directly performs the process of determining whether the network configuration is abnormal.

In an example, the network configuration includes, but is not limited to, configuration of DHCP service, configuration of Domain Name System (DNS), configuration of local route table, configuration of Internet Protocol Security (IPSec), configuration of LSP chain, configuration of TCP connection state of client, configuration of local IP address table, configuration of TCP/IP driving program reliability, and configuration of NDIS network filter driver.

At block 103, the client restores the network configuration into default network configuration when determining that the network configuration is abnormal. The default network configuration is system configuration used when the communication between the client and the cloud is normal.

At block 104, after the network configuration is restored into the default network configuration, the client determines whether the communication between the client and the cloud is abnormal.

At block 105, the client prompts a user that the communication between the client the cloud is abnormal if the communication between the client and the cloud is still abnormal after the network configuration is restored into the default network configuration.

It may be concluded from blocks 5103 and 5104 that, if the communication between the client and the cloud is still abnormal after the network configuration is restored into the default network configuration, it is not because of the network configuration that the communication between the client and the cloud is abnormal, and the abnormity of the communication between the client and the cloud may be caused by other reasons. At this time, the client performs block 105, and guides the user to confirm and return information through other network tools such as mails and instant messaging software.

If the communication between the client and the cloud becomes normal after the network configuration is restored into the default network configuration, the client may determine that the network configuration may be juggled by a virus, and thus may scan files to obtain the virus.

By the method shown in FIG. 2, when the communication between the client and the cloud is abnormal, the client may restore the network configuration into the default network configuration rapidly. After the network configuration is restored into the default network configuration, the client may determine whether the communication between the client and the cloud is abnormal. If the communication between the client and the cloud is still abnormal, the client may prompt the user that the communication between the client and the cloud is abnormal, and guides the user to confirm and return information through other network tools such as mails and instant messaging software, so that the client may be connected to the cloud in time and the cloud may process the virus.

In an example, the method may further include a following process after block S102. If the client determines that the network configuration is normal, the client prompts the user that the communication between the client and the cloud is abnormal.

When the client determines that the communication between the client and the cloud is abnormal but the network configuration is normal, it is unknown that which reasons cause the abnormity of the communication between the client and the cloud. Accordingly, the client prompts the user that the communication between the client and the cloud is abnormal, and guides the user to confirm and return information through other network tools such as mails and instant messaging software.

If there is security software of local engine on the client, the client may directly scan files.

Figure 3:
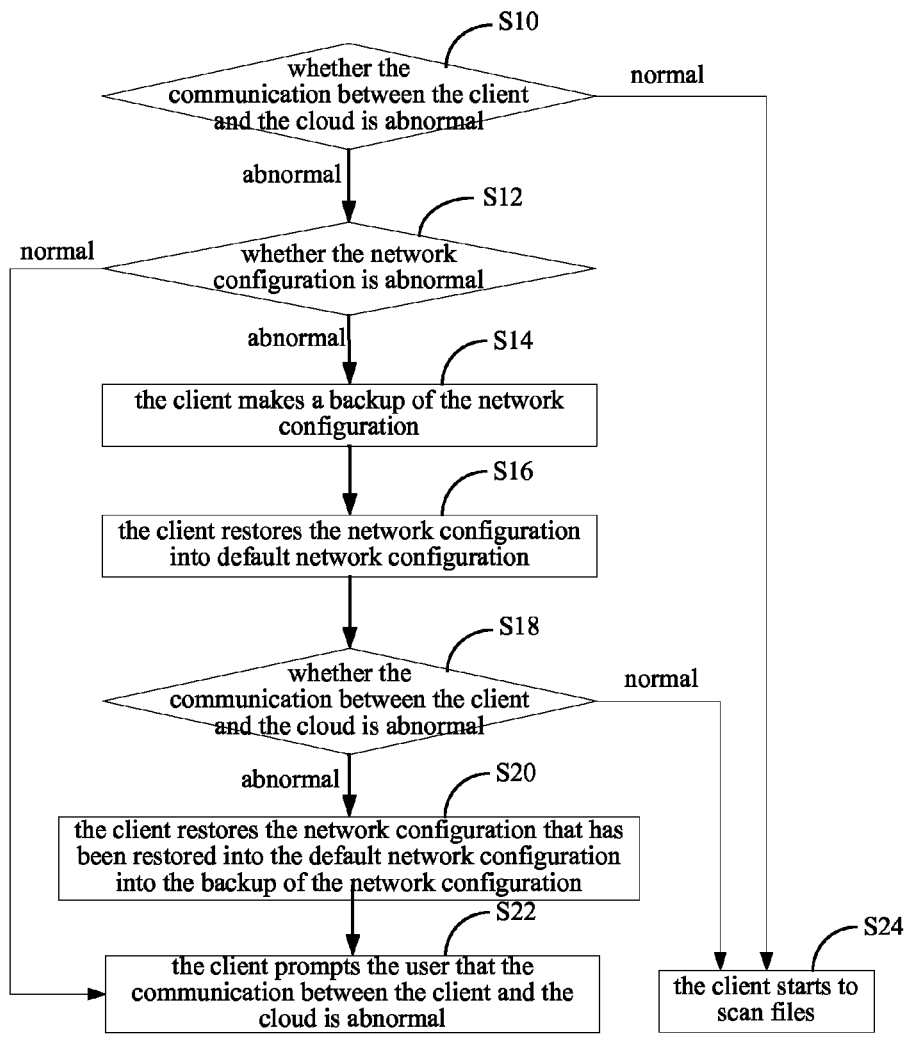
FIG. 3 is a schematic flowchart illustrating a method for ensuring reliable communication between a security software client and cloud according to another example of the present invention.

FIG. 3 is a schematic flowchart illustrating a method for ensuring reliable communication between a security software client and cloud according to another example of the present invention. The method includes following blocks.

At S10, the client detects whether the communication between the client and the cloud is abnormal. If the communication between the client and the cloud is abnormal, block S12 is performed. If the communication between the client and the cloud is normal, block S24 is performed.

A process of detecting whether the communication between the client and the cloud is abnormal may include, comparing the success rate of accessing a common site with a predefined success rate threshold, comparing the success rate of accessing a security software site with the predefined success rate threshold, and determining that the communication between the client and the cloud is abnormal if the success rate of accessing the common site is within an acceptable range but the success rate of accessing the security software site is not within the acceptable range. Otherwise, the client determines that the communication between the client and the cloud is normal. In another example, the process of detecting whether the communication between the client and the cloud is abnormal may include, comparing the speed of accessing the common site with a predefined speed threshold, comparing the speed of accessing the security software site with the predefined speed threshold, and determining that the communication between the client and the cloud is abnormal if the speed of accessing the common site is within an acceptable range but the speed of accessing the security software site is not within the acceptable range. Otherwise, the client determines that the communication between the client and the cloud is normal.

At block S12, the client determines whether the network configuration is abnormal when determining that the communication between the client and the cloud is abnormal. If the network configuration is abnormal, blocks S14 and S16 are performed. The default network configuration is system configuration used when the communication between the client and the cloud is normal.

At block S14, the client makes a backup of the network configuration.

At block S16, the client restores the network configuration into default network configuration.

At block S18, after the network configuration is restored into the default network configuration, the client determines whether the communication between the client and the cloud is abnormal. A process of determining whether the communication between the client and the cloud is abnormal after the network configuration is restored into the default network configuration at block S18 may be similar to the process of detecting whether the communication between the client and the cloud is abnormal at block S10.

In an example, the network configuration includes, but is not limited to, configuration of DHCP service, configuration of DNS, configuration of local route table, configuration of IP Sec, configuration of LSP chain, configuration of TCP connection state of client, configuration of local IP address table, configuration of TCP/IP driving program reliability, and configuration of NDIS network filter driver.

If the communication between the client and the cloud is still abnormal after the network configuration is restored into the default network configuration, block S22 may be performed.

At block S22, the client prompts the user that the communication between the client and the cloud is abnormal.

It may be concluded from blocks S18 and S22 that, if the communication between the client and the cloud is still abnormal after the network configuration is restored into the default network configuration, it is not because of the network configuration that the communication between the client and the cloud is abnormal, and the abnormity of the communication between the client and the cloud may be caused by other reasons. At this time, the client performs block S22, and guides the user to confirm and return information through other network tools such as mails and instant messaging software. If there is security software of local engine on the client, the client may directly perform block S24.

At block S24, the client starts to scan files.

In an example, if the communication between the client and the cloud is still abnormal after the network configuration is restored into the default network configuration, block S20 is performed, and then block S22 is performed.

At block S20, the client restores the network configuration that has been restored into the default network configuration into the backup of the network configuration.

If the client determines that the network configuration is still abnormal after the network configuration is restored into the default network configuration, it may be not because of the network configuration that the communication between the client and the cloud is abnormal, and thus the client restores the network configuration that has been restored into the default network configuration into the backup of the network configuration. In this way, it may be ensured that items configured initiatively by the user are not juggled during initial network detection.

If the communication between the client and the cloud is normal after the network configuration is restored into the default network configuration, block S24 may be performed.

If the communication between the client and the cloud becomes normal after the network configuration is restored into the default network configuration, the client may determine that the network configuration may be juggled by a virus. Accordingly, block S24 is performed automatically.

If the client determines that the network configure is normal at block S12, but the communication between the client and the cloud is still abnormal, block S22 is performed.

In an example, the process of determining whether the network configuration is abnormal may include determining whether each of following configuration is abnormal. The following configurations include configuration of DHCP service, configuration of DNS, configuration of local route table, configuration of IPSec, configuration of LSP chain, configuration of TCP connection state of client, configuration of local IP address table, configuration of TCP/IP driving program reliability, and configuration of NDIS network filter driver. The client performs blocks S14, S16, S18 and S20 in turn according to a determining result of each configuration. Afterwards, the client performs block S22.

In the method shown in FIG. 3, the client may initiatively detect whether the communication between the client and the cloud is abnormal before starting to scan files, and may prompt the user that the communication between the client and the cloud is abnormal even if the network configuration is normal. Accordingly, client may guide the user to establish a connection with the cloud through other means, so that the cloud may process the virus on the client.

In the method shown in FIG. 3, when the network configuration is abnormal, the network configuration may be restored into the default network configuration. When the local blacklist is unable to be updated and the cloud blacklist is unable to be accessed, the network configuration is restored into the default network configuration. In this way, the client may determine rapidly whether the network configuration is juggled by a virus or whether the communication abnormity is caused by error configuration of the user. If the client determines that the network configuration is juggled by a virus, the client may start to scan files.

In an example, a non-transitory computer readable medium is provided, which includes computer program codes for executing the steps in the above mentioned method.

Figure 4:
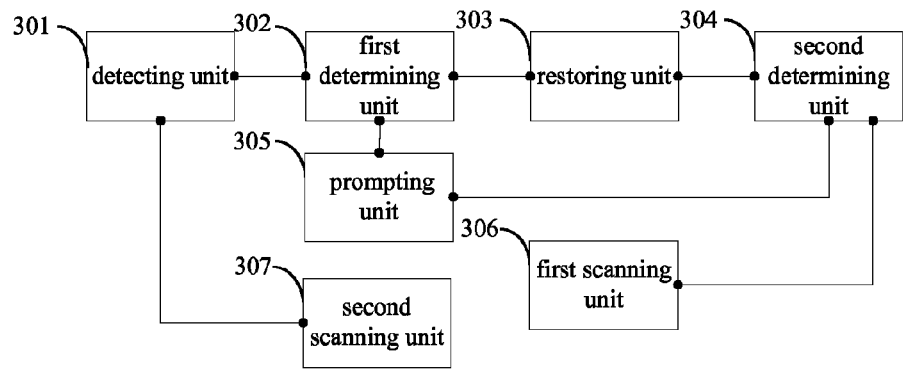
FIG. 4 is a schematic diagram illustrating a security software client according to an example of the present invention.

FIG. 4 is a schematic diagram illustrating a security software client according to an example of the present invention. The client includes a detecting unit 301, a first determining unit 302, a restoring unit 303, a second determining unit 304 and a prompting unit 305.

The detecting unit 301 is to detect whether the communication between the client and cloud is abnormal.

In an example, the detecting unit 301 is to compare the success rate of accessing a common site with a predefined success rate threshold, compare the success rate of accessing a security software site with the predefined success rate threshold, and determine that the communication between the client and the cloud is abnormal if the success rate of accessing the common site is within an acceptable range but the success rate of accessing the security software site is not within the acceptable range; otherwise, determine that the communication between the client and the cloud is normal.

In another example, the detecting unit 301 is to compare the speed of accessing the common site with a predefined speed threshold, compare the speed of accessing the security software site with the predefined speed threshold, and determine that the communication between the client and the cloud is abnormal if the speed of accessing the common site is within an acceptable range but the speed of accessing the security software site is not within the acceptable range; otherwise, determine that the communication between the client and the cloud is normal.

The first determining unit 302 is to determine whether network configuration is abnormal when the detecting unit 301 determines that the communication between the client and the cloud is abnormal.

In an example, the detecting unit 301 may trigger the first determining unit 302 to determine whether the network configuration is abnormal. In another example, the first determining unit 302 may directly determine whether the network configuration is abnormal.

If the network configuration is juggled by a virus, the communication between the client and the cloud may become abnormal. It may be determined according to the operation of the first determining unit 302 whether the client is infected by the virus.

In an example, the network configuration includes, but is not limited to, configuration of DHCP service, configuration of DNS, configuration of local route table, configuration of IP Sec, configuration of LSP chain, configuration of TCP connection state of client, configuration of local IP address table, configuration of TCP/IP driving program reliability, and configuration of NDIS network filter driver.

The restoring unit 303 is to restore the network configuration into default network configuration if the first determining unit 302 determines that the network configuration is abnormal. The default network configuration is system configuration used when the communication between the client and the cloud is normal.

The second determining unit 304 is to determine whether the communication between the client and the cloud is abnormal after the restoring unit 303 restores the network configuration into the default network configuration.

The prompting unit 305 is to prompt the user that the communication between the client and the cloud is abnormal after the second determining unit 304 determines that the communication between the client and the cloud is abnormal.

When the communication between the client shown in FIG. 4 and the cloud is abnormal, the client may restore the network configuration into the default network configuration rapidly. The client determines whether the communication between the client and the cloud is abnormal after restoring the network configuration into the default network configuration. If the communication between the client and the cloud is still abnormal, the client prompts the user that the communication between the client and the cloud is abnormal, and guides the user to confirm and return information through other network tools such as mails or instant messaging software. In this way, the client may be connected to the cloud in time, and the cloud may process the viruses.

The prompting unit 305 is further to prompt the user that the communication between the client and the cloud is abnormal when the first determining unit 302 determines that the network configuration is normal.

When the client determines that the communication between the client and the cloud is abnormal but the network configuration is normal, it is unknown that which reasons cause the abnormity of the communication between the client and the cloud. Accordingly, the client prompts the user that the communication between the client and the cloud is abnormal, and guides the user to confirm and return information through other network tools such as mails and instant messaging software.

In an example, the client further includes a first scanning unit 306.

The first scanning unit 306 is to start to scan files when the second determining unit 304 determines that the communication between the client and the cloud is abnormal.

In an example, the client further includes a second scanning unit 307.

The second scanning unit 307 is to start to scan files when the detecting unit 301 determines that the communication between the client and the cloud is normal.

The client provided by the example of the present invention may initiatively detect whether the communication between the client and the cloud is abnormal, and may prompt the user that the communication between the client and the cloud is abnormal even if the network configuration is normal. Accordingly, the client may guide the user to establish a connection with the cloud through other means, so that the cloud may process the virus on the client.

When the network configuration is abnormal, the network configuration may be restored into the default network configuration. When the local blacklist is unable to be updated and the cloud blacklist is unable to be accessed, the network configuration may be restored into the default network configuration. In this way, the client may determine rapidly whether the network configuration is juggled by a virus or whether the communication abnormity is caused by error configuration of the user. If the client determines that the network configuration is juggled by a virus, the client may start to scan files.

Figure 5:
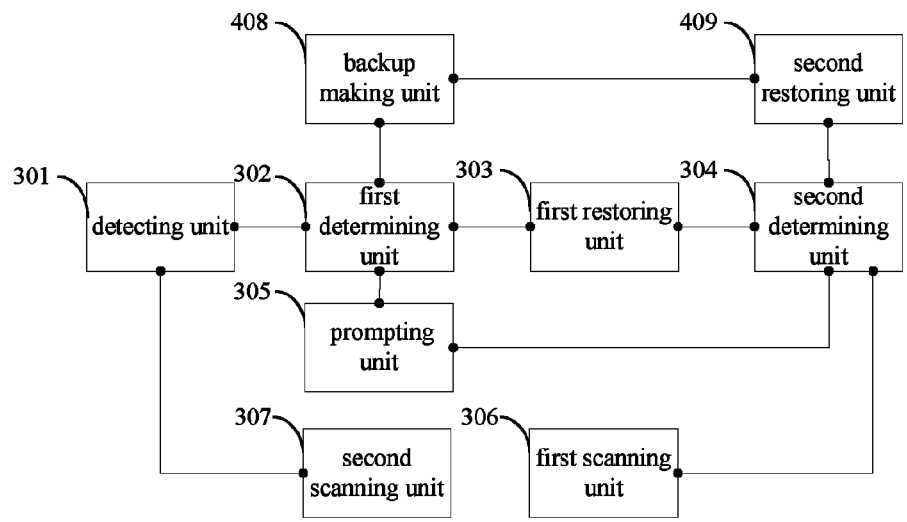
FIG. 5 is a schematic diagram illustrating a security software client according to another example of the present invention.

FIG. 5 is a schematic diagram illustrating a security software client according to another example of the present invention. Compared with the client shown in FIG. 4, the client shown in FIG. 5 further includes a backup making unit 408 and a second restoring unit 409. In this case, the restoring unit 303 may be called a first restoring unit 303.

The backup making unit 408 is to make a backup of the network configuration.

The second restoring unit 409 is to, if the second determining unit 304 determines that the communication between the client and the cloud is abnormal, restore the network configuration that has been restored into the default network configuration into the backup of the network configuration before the prompting unit 305 prompts the user that the communication between the client and the cloud is abnormal.

Through the backup making unit 408 and the second restoring unit 409, it may be ensured that items configured initiatively by the user are not juggled during initial network detection.

Figure 6:
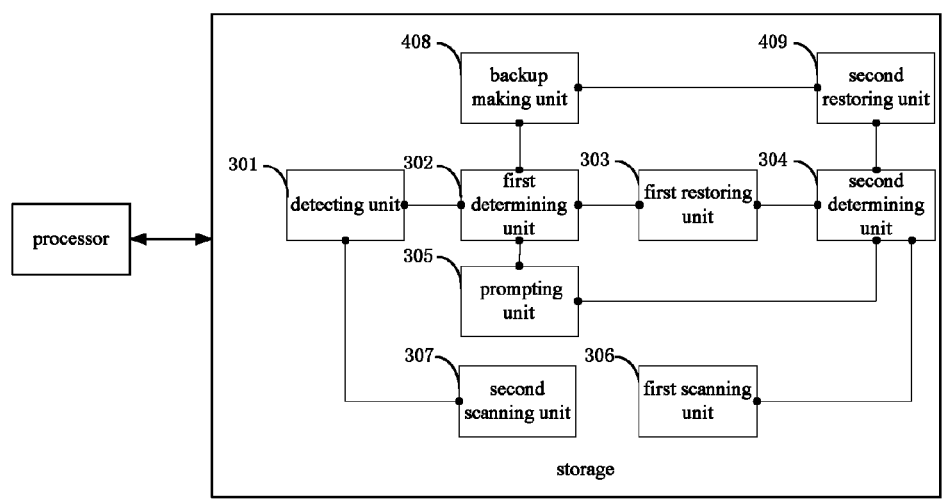
FIG. 6 is a schematic diagram illustrating a security software client according to another example of the present invention.

FIG. 6 is a schematic diagram illustrating a security software client according to another example of the present invention. As shown in FIG. 6, the security software client at least includes storage and a processor communicated with the storage. The storage includes a detecting instruction, a first determining instruction, a first restoring instruction, a second determining instruction and a prompting instruction which can be executed by the processor.

The detecting instruction is to detect whether communication between the security software client and cloud is abnormal.

The first determining instruction is to determine whether network configuration is abnormal when the detecting instruction determines that the communication between the security software client and the cloud is abnormal.

The first restoring instruction is to restore the network configuration into default network configuration when the first determining instruction determines that the network configuration is abnormal, wherein the default network configuration is system configuration used when the communication between the security software client and the cloud is normal.

The second determining instruction is to determine whether the communication between the security software client and the cloud is abnormal after the first restoring instruction restores the network configuration into the default network configuration.

The prompting instruction is to prompt a user that the communication between the security software client and the cloud is abnormal after the second determining instruction determines that the communication between the security software client and the cloud is abnormal.

The detecting instruction is to compare the success rate of accessing a common site with a predefined success rate threshold, compare the success rate of accessing a security software site with the predefined success rate threshold, and determine that the communication between the security software client and the cloud is abnormal if the success rate of accessing the common site is within an acceptable range but the success rate of accessing the security software site is not within the acceptable range; otherwise, determine that the communication between the security software client and the cloud is normal.

The detecting instruction is to compare the speed of accessing a common site with a predefined speed threshold, compare the speed of accessing a security software site with the predefined speed threshold, and determine that the communication between the security software client and the cloud is abnormal if the speed of accessing the common site is within an acceptable range but the speed of accessing the security software site is not within the acceptable range; otherwise, determine that the communication between the security software client and the cloud is normal.

The prompting instruction is further to prompt the user that the communication between the client and the cloud is abnormal when the first determining instruction determines that the network configuration is normal.

The network configuration includes at least one of configuration of Dynamic Host Configuration Protocol (DHCP) service, configuration of Domain Name System (DNS), configuration of local route table, configuration of Internet Protocol Security (IPSec), configuration of Layered Service Provider (LSP) chain, configuration of TCP connection state of security software client, configuration of local IP address table, configuration of TCP/IP driving program reliability, and configuration of Network Driver Interface Specification (NDIS) network filter driver.

The security software client further includes a backup making instruction and a second restoring instruction.

The backup making instruction is to make a backup of the network configuration before the first restoring instruction restores the network configuration into the default network configuration.

The second restoring instruction is to, if the second determining instruction determines that the communication between the security software client and the cloud is abnormal, restore the network configuration that has been restored into the default network configuration into the backup of the network configuration before the prompting instruction prompts the user that the communication between the security software client and the cloud is abnormal.

The security software client further includes a first scanning instruction, to start to scan files when the second determining instruction determines that the communication between the security software client and the cloud is normal.

The security software client further includes a second scanning instruction, to start to scan files when the detecting instruction determines that that the communication between the security software client and the cloud is normal.

Those skilled in the art can understand that all or part of steps in the method provided by the examples of the present invention can be implemented by instructing related hardware by a program, the program may be stored in a readable memory of a computer, and above method steps are included when the program is operated. The memory includes a ROM/RAM, a disk, a Compact Disc (CD) and so on.

The forgoing is a method for ensuring reliable communication between the security software client and the cloud, and a client. Those skilled in the art may modify the implementation and application scope of the present invention according to the examples of the present invention. Accordingly, the description should not be used to limit the protection scope of the present invention.

What is claimed is:

1. A method for ensuring reliable communication between a security software client and cloud, comprising:
    detecting whether communication between the security software client and the cloud is abnormal according to at least one of an access success rate or an access speed;
    determining whether network configuration is abnormal if the communication between the security software client and the cloud is abnormal;
    restoring the network configuration into default network configuration if the network configuration is abnormal, wherein the default network configuration is system configuration used when the communication between the security software client and the cloud is normal;
    determining whether the communication between the security software client and the cloud is abnormal after the network configuration is restored into the default network configuration; and
    prompting a user that the communication between the security software client and the cloud is abnormal if the communication between the security software client and the cloud is abnormal after the network configuration is restored into the default network configuration.

2. The method of claim 1, wherein, when detecting whether the communication between the security software client and the cloud is abnormal according to the access success rate, detecting whether the communication between the security software client and the cloud is abnormal comprises:
    comparing the success rate of accessing a common site with a predefined success rate threshold, comparing the success rate of accessing a security software site with the predefined success rate threshold, and determining that the communication between the security software client and the cloud is abnormal if the success rate of accessing the common site is within an acceptable range but the success rate of accessing the security software site is not within the acceptable range; otherwise, determining that the communication between the security software client and the cloud is normal.

3. The method of claim 1, wherein, when detecting whether the communication between the security software client and the cloud is abnormal according to the access speed, detecting whether the communication between the security software client and the cloud is abnormal comprises:
    comparing the speed of accessing a common site with a predefined speed threshold, comparing the speed of accessing a security software site with the predefined speed threshold, and determining that the communication between the security software client and the cloud is abnormal if the speed of accessing the common site is within an acceptable range but the speed of accessing the security software site is not within the acceptable range; otherwise, determining that the communication between the security software client and the cloud is normal.

4. The method of claim 1, further comprising:
starting to scan files when determining that the communication between the security software client and the cloud is normal.

5. The method of claim 1, wherein the network configuration comprises at least one of
configuration of Dynamic Host Configuration Protocol (DHCP) service, configuration of Domain Name System (DNS), configuration of local route table, configuration of Internet Protocol Security (IPSec), configuration of Layered Service Provider (LSP) chain, configuration of TCP connection state of security software client, configuration of local IP address table, configuration of TCP/IP driving program reliability, and configuration of Network Driver Interface Specification (NDIS) network filter driver.

6. The method of claim 1, before restoring the network configuration into the default network configuration, further comprising:
making a backup of the network configuration; and
if it is determined that the communication between the security software client and the cloud is abnormal after the network configuration is restored into the default network configuration, the method further comprises:
restoring the network configuration that has been restored into the default network configuration into the backup of the network configuration before prompting the user that the communication between the security software client and the cloud is abnormal.

7. The method of claim 1, further comprising:
starting to scan files if it is determined that the communication between the security software client and the cloud is normal after the network configuration is restored into the default network configuration.

8. The method of claim 1, further comprising:
prompting the user that the communication between the security software client and the cloud is abnormal if it is determined that the network configuration is normal.

9. A security software client, comprising a processor and a non-transitory computer readable storage medium, wherein
the non-transitory computer readable storage medium stores computer executable instructions, wherein the computer executable instructions comprise a set of detecting instructions, a set of first determining instructions, a first set of restoring instructions, a second set of determining instructions and a set of prompting instructions, and
the processor executes the computer executable instructions stored in the non-transitory computer readable storage medium to perform a method of:
detecting, according to the set of detecting instructions, whether communication between the security software client and cloud is abnormal according to at least one of an access success rate or an access speed;
determining, according to the set of first determining instructions, whether network configuration is abnormal when the set of detecting instructions determines that the communication between the security software client and the cloud is abnormal;
restoring, according to the set of restoring instructions, the network configuration into default network configuration when the first set of determining instructions determines that the network configuration is abnormal, wherein the default network configuration is system configuration used when the communication between the security software client and the cloud is normal;
determining, according to the second set of determining instructions, whether the communication between the security software client and the cloud is abnormal after the first restoring instruction restores the network configuration into the default network configuration; and
prompting, according to the set of prompting instructions, a user that the communication between the security software client and the cloud is abnormal after the second determining instruction determines that the communication between the security software client and the cloud is abnormal.

10. The security software client of claim 9, wherein the method further comprises:
comparing the success rate of accessing a common site with a predefined success rate threshold;
comparing the success rate of accessing a security software site with the predefined success rate threshold; and
determining that the communication between the security software client and the cloud is abnormal when the success rate of accessing the common site is within an acceptable range but the success rate of accessing the security software site is not within the acceptable range; otherwise, determining that the communication between the security software client and the cloud is normal.

11. The security software client of claim 9, wherein the method further comprises:
comparing the speed of accessing a common site with a predefined speed threshold;
comparing, the speed of accessing a security software site with the predefined speed threshold; and
determining, that the communication between the security software client and the cloud is abnormal if the speed of accessing the common site is within an acceptable range but the speed of accessing the security software site is not within the acceptable range; otherwise, determining that the communication between the security software client and the cloud is normal.

12. The security software client of claim 9, wherein the method further comprises:
prompting the user that the communication between the client and the cloud is abnormal when the first set of determining instructions determines that the network configuration is normal.

13. The security software client of claim 9, wherein the network configuration comprises at least one of
configuration of Dynamic Host Configuration Protocol (DHCP) service, configuration of Domain Name System (DNS), configuration of local route table, configuration of Internet Protocol Security (IPSec), configuration of Layered Service Provider (LSP) chain, configuration of TCP connection state of security software client, configuration of local IP address table, configuration of TCP/IP driving program reliability, and configuration of Network Driver Interface Specification (NDIS) network filter driver.

14. The security software client of claim 9, wherein the computer executable instructions further comprise a set of backup making instructions and a second set of restoring instructions, wherein the method further comprises:

making a backup of the network configuration before the first set of restoring instructions restores the network configuration into the default network configuration; and restoring the network configuration that has been restored into the default network configuration into the backup of the network configuration before the set of prompting instructions prompts the user that the communication between the security software client and the cloud is abnormal, when the second set of determining instruction determines that the communication between the security software client and the cloud is abnormal.

15. The security software client of claim 9, wherein the computer executable instructions further comprise a first set of scanning instructions, wherein the method further comprises:

starting to scan files when the second set of determining instructions determines that the communication between the security software client and the cloud is normal.

16. The security software client of claim 9, wherein the computer executable instructions further comprise a second set of scanning instructions, wherein the method further comprises:

starting to scan files when the set of detecting instructions determines that that the communication between the security software client and the cloud is normal.

17. A non-transitory computer readable storage medium, comprising computer executable instructions, when executed by a processor, the computer executable instructions cause the processor to perform following steps:

detecting whether communication between the security software client and the cloud is abnormal according to at least one of an access success rate or an access speed;

determining whether network configuration is abnormal if the communication between the security software client and the cloud is abnormal;

restoring the network configuration into default network configuration if the network configuration is abnormal, wherein the default network configuration is system configuration used when the communication between the security software client and the cloud is normal;

determining whether the communication between the security software client and the cloud is abnormal after the network configuration is restored into the default network configuration; and prompting a user that the communication between the security software client and the cloud is abnormal if the communication between the security software client and the cloud is abnormal after the network configuration is restored into the default network configuration.

* * * * *